United States Patent
Ghosh et al.

(10) Patent No.: US 7,065,068 B2
(45) Date of Patent: Jun. 20, 2006

(54) MULTI CHANNEL STOP AND WAIT ARQ COMMUNICATION METHOD AND APPARATUS

(75) Inventors: Amitava Ghosh, Vernon Hills, IL (US); Brian Classon, Palatine, IL (US); Mark Cudak, Mc Henry, IL (US); Louay A. Jalloul, Campbell, CA (US)

(73) Assignee: Motorola, Inc., Schaumburg, IL (US)

( * ) Notice: Subject to any disclaimer, the term of this patent is extended or adjusted under 35 U.S.C. 154(b) by 1122 days.

(21) Appl. No.: 09/742,905

(22) Filed: Dec. 20, 2000

(65) Prior Publication Data

US 2002/0075842 A1   Jun. 20, 2002

Related U.S. Application Data

(60) Provisional application No. 60/173,694, filed on Dec. 29, 1999.

(51) Int. Cl.
*H04B 7/216* (2006.01)
*H04L 1/18* (2006.01)

(52) U.S. Cl. .................. 370/342; 370/428; 370/335; 714/748

(58) Field of Classification Search ........... 370/335, 370/342, 345–348, 329, 428, 328, 338; 455/450–452.2, 455/509–512
See application file for complete search history.

(56) References Cited

U.S. PATENT DOCUMENTS

| | | | |
|---|---|---|---|
| 5,940,769 A * | 8/1999 | Nakajima et al. | 455/452.2 |
| 6,021,124 A * | 2/2000 | Haartsen | 370/345 |
| 6,236,647 B1 * | 5/2001 | Amalfitano | 370/335 |
| 6,275,488 B1 * | 8/2001 | Cudak et al. | 370/347 |
| 6,388,999 B1 * | 5/2002 | Gorsuch et al. | 370/335 |
| 6,424,645 B1 * | 7/2002 | Kawabata et al. | 370/347 |
| 6,542,490 B1 * | 4/2003 | Ahmadvand et al. | 370/338 |

FOREIGN PATENT DOCUMENTS

WO   WO 99/09698 A   2/1999

OTHER PUBLICATIONS

Nachum Shacham, A Selective Repeat ARQ protocol for parallel channels and its resequencing analysis, 1992, IEEE, pp. 773-782.*

Jin-Fu Chang, Multichannel ARQ protocols, Apr. 1993, IEEE, p. 592-598.*

Hui Huang etal.: "A wireless ATM MAC protocol with combined hybrid ARQ and scheduling", Vehicular Technology Conference, 1999. VTC 1999-Fall. IEEE VTS 50TH Amsterdam, Netherlands Sep. 19-22, 1999, Piscataway, NJ. USA, IEEE, US. Sep. 19, 1999, pp. 1720-1724.

(Continued)

*Primary Examiner*—Steven Nguyen
(74) *Attorney, Agent, or Firm*—Kenneth A. Haas; Lalita W. Pace

(57) ABSTRACT

A method in a communication system (100) includes transmitting from a source user (101) a first data packet (111) over a first time frame (121) having a finite time period (131), transmitting from source user (101) a second data packet (112) over a second time frame (122) immediately subsequent to first time frame (121), detecting an acknowledgment of acceptable reception of data packet associated with either first or said second data packets (111 and 112), repeating transmission of first and second data packets (111 and 112) in a sequence of first and second time frames (121 and 122) in a time frame sequence (190) until the detection.

14 Claims, 5 Drawing Sheets

OTHER PUBLICATIONS

Wicker S B et al.: "Type-II Hybrid-ARQ Protocols Using Punctured MDS Codes", IEEE Transactions on Communications, IEEE Inc. New York, US. vol. 42, No. 2/3/4, Feb. 1, 1994, pp. 1431-1440.

* cited by examiner

MULTI CHANNEL STOP AND WAIT ARQ COMMUNICATION METHOD AND APPARATUS

REFERENCES TO RELATED APPLICATION(S)

This application is related to provisional U.S. Application No. 60/173,694 filed Dec. 29, 1999; which is incorporated by reference herein.

RELATED FIELD OF THE INVENTION

The invention relates to the filed of communications, and more particularly, to data communications.

BACKGROUND OF THE INVENTION

Automatic repeat request (ARQ) schemes are commonly used in data communication to provide a more efficient communication between a source user and a destination user. Several types of ARQ, such as hybrid ARQ, stop-and-wait ARQ, go-back-N (GBN) ARQ and selective repeat (SR) ARQ are available where each provides an efficient use of the communication resources between a source user and a destination user. However, each of the prior arts schemes suffers from at least one problem that makes the communication system more complex, more expensive or inefficient for data communication.

For example, in case of hybrid ARQ, the destination user stores soft versions of the previously sent copies of data packet for soft combining. The data packet with possibly additional incremental redundancy in the channel is sent which increases the coding rate and effectively lowering the communication data rate. The destination user may effectively soft-combine the soft copy stored in the memory with the newly arrived soft copy to decode the data in the data packet. The communication system resources may remain idle between the previous and the new transmission times. The complexity of the communication system as a result is increased due to requirements of additional control, code construction, decoder implementation, and memory requirements.

A general description of prior-art ARQ is given with reference to FIG. 1. In a communication system 100, a source user 101 transmits a first data packet 111 over a first time frame 121 having a finite time period 131. Source user 101 may be a base station in communication system 100. Source user 101 may be in communication with several destination users such as destination users 151–54. Such communication may by way of a forward link 180 received by a group of targeted destination users, and a corresponding reverse links 181–84. Such destination users may be mobile stations in communication system 100. Communication system 100 may be operating according to any of the known communication standards such as GSM, IS-95A, B and C, and Wideband Code Division Multiple Access (WCDMA) of the Third Generation Partnership Program. Source user 101 transmits a second data packet 112 over a second time frame 122, where second time frame 122 is immediately subsequent to first time frame 121 in a sequence of time frames 190. Sequence of time frames 190 is transmitted via forward link 180.

When a destination user receives a data packet and decodes the packet satisfactorily without error according to a standard, the destination user transmits back on a control channel via a reverse link an acknowledgment message to the source user acknowledging acceptable reception of the data packets. In this case, if first data packet 111 is targeted for destination user 151, destination user 151 transmits an acknowledgement via reverse link 181 to source user 101 acknowledging acceptable reception of the first data packet 111.

Source user 101 repeats transmission of first and second data packets 111 and 112 in a sequence of first and second time frames 121 and 122 until detecting the acknowledgment of acceptable reception of either data packet 111 or 112. After transmission of data packets 111, source user 101 expects detection of an acknowledgment of acceptable reception of data packet 111, and similarly after transmission of data packet 112, source user 101 expects detection of an acknowledgment of acceptable reception of data packet 112. If acknowledgement associated with data packet 111 has not arrived at source user 101 before transmitting a time frame 123, transmission of data packet 111 is repeated in time frame 123 which is immediately subsequent to time frame 112. Similarly, if acknowledgement associated data packets 112 has not arrived before transmitting a time frame 124, transmission of data packet 112 is repeated in time frame 124. The transmission sequence of data packets 111 and 112 is repeated until arrival of an acknowledgement associated with either data packets 111 or 112. In all cases above describing a repeat of data packet, it is possible to substitute an associated packet constructed entirely of parity information or an alternate combination of information and parity. This substitution represents an alternate form of Hybrid ARQ known as Incremental Redundancy.

After the acknowledgment of acceptable reception to either data packet 111 or 112, source user terminates transmission of its associated data packet. Source user 101 transmits a third data packet in substitute of the terminated data packet in the sequence of the first and second time frames.

The sequence of the first and second time frames may be consecutively odd and even numbered time frames in numbered time frames such as time frame sequence 190 in a time division multiple access communication system. If time frame 121 is numbered as "n", an even number time frame, time frame 122 is then an odd numbered time frame, time frame "n+1". Similarly time frame 123, time frame "n+2", is an even numbered time frame, and time frame 124, time frame "n+3", an odd numbered time frame, and so on. The first time frame may be referred to as an odd numbered channel and second time frames as an even numbered channel immediately subsequent to the odd numbered channel in a time division multiple access communication system.

If data packet 111 was transmitted on an even numbered time frame and data packet 112 on an odd numbered time frame of sequence of time frames 190, transmission of data packets 111 and 112 on even and odd numbered time frames continues until an acknowledgement associated with either data packet 111 or 112 is detected at source user 101. For example, if the acknowledgement is associated with data packet 112, a third data packet is selected for transmission in substitute of the data packet 112. As such, the third data packet is transmitted on the odd time frames, and the data packet 111 on the even time frames of sequence of time frames 190.

The first and second data packets may be transmitted for a same destination user or a first and second destination users. For example, in down link 180, data packets 111 and 112 may be destined for a single destination user such as any of the destination users 151–54. In another situation, the data packets 111 and 112 may be destined for respectively destination users 151 and 152, for example. Similarly, any substituted data packet may be for the same or different destination users.

In case the downlink received by a destination user is in poor condition, an acknowledgement may not be transmitted from the destination user for some time. During this time, the data packets destined for such a destination user may be repeated many times in the first and second time frames. To avoid unnecessary usage of the communication resources in the down link 180, source user 101 limits transmission of the data packet to a predetermined number of repetitions.

Source user 101, along with other blocks such as an encoder (not shown), may include a queue buffer 102 for buffering data packets for transmission. A channel sequencer 103 retrieves the first and second data packets from queue buffer 102 and aligns the first and second data packets in sequence to be received by a transmitter 104 for transmission from an antenna 105 from source user 101. Queue buffer 102 may buffer data packets according to a transmission priority of the first and second data packets. In case of transmitting a third data packet, the first, second and third data packets are queued in buffer for transmission from the source user according to a transmission priority. The third data packet may be selected from a plurality of data packets in queue buffer 102 based on a transmission priority when being substituted for either the first or the second data packet in the sequence of the first and second (i.e. even and odd or odd and even) time frames.

To perform hybrid ARQ portion, the destination users combines correspondingly soft copies of the repeated transmission of data packets for decoding the data in the data packet. Once a data packet satisfactorily is decoded via soft combining, the destination user generates and transmits an acknowledgment of acceptable reception of data packet. As such, when the first and second data packets are destined for the same destination user as a mobile station, the mobile station is required to have a memory buffer for storing the first and second data packets upon arrival. In case of soft combining, soft copies of the first and second data packets may need to be stored. This is a substantial reduction in memory requirement in a mobile station operating in a communication system relative to alternative ARQ schemes according to various aspects of the invention.

In case the acknowledgment of acceptable repetition of a data packet can not arrive within a time frame, a time in units of a finite time period is determined when at a source user a feedback acknowledgment can arrive acknowledging acceptable reception of a data packet at a destination user. The finite time period may equal to duration of time frame. A source user transmits multiple data packets in a sequence of multiple time frames equal to the determined units of time frames. While waiting for detecting an acknowledgment of acceptable reception of data packet associated with either one of the multiple data packets, transmission of the multiple of data packets in the sequence of multiple time frames is repeated. The time may be approximately an earliest time when at the source user the feedback acknowledgment can arrive acknowledging acceptable reception of the data packet at a destination user.

After detecting an acknowledgement, transmission of either one of the multiple data packets associated with the acknowledgement in the sequence of multiple time frames is terminated. A new data packet is transmitted in substitute of the terminated data packet in the sequence of the multiple time frames. The multiple data packets may be transmitted for a same destination user, or a multiple destination users. The number of retransmission of the multiple data packets may be limited according to a predetermined number of repetitions to avoid unnecessary usage of the communication resources in case of a poor communication between the source user and one of the destination users.

The multiple time frames may be consecutively numbered time frames in a numbered time frames in a time division multiple access communication system. At the destination users, soft copies of the repeated transmission of data packets correspondingly are combined for generating and transmitting a corresponding acknowledgment of acceptable reception of data packet.

When used in a Code Division Multiple Access (CDMA) system, it is possible to send multiple packets in the even period and multiple packets in the odd period. When anyone of the multiple packets is acknowledged it may be replaced independently of all the other packets in the manner described previously. Various aspects of the invention may be implemented by way of software or hardware implementations. Use of such methods is well known in the art. The source user may be a base station and the destination user may be mobile stations in a cellular communication system. The source user and destination user may also employ an encoding and decoding apparatus known in the art.

In case of selective repeat ARQ, source user transmits data packets with a sequence number to be decoded by the destination user. If a data packet arrives with error at the destination user, the destination user sends a message to the source user for re-transmission of the packet of data while identifying the data packet sequence number. Depending on the length of delay of such feedback to the source user, the maximum sequence number is increased to allow for the length of the feedback delay. As such, the destination user, for example a mobile station, may be required to have a large memory segment to store transmission of packets of data until all data packets including the packet with the maximum sequence number have arrived without error. The number of data packets stored at the destination user may increase substantially which places a high burden on the memory requirements.

In case of stop-and-wait ARQ, the source user transmits only one packet of data and waits until it receives an indication of successful reception at the destination user, then the source user transmits another data packet. The communication channel remains idle while the source is waiting for the acknowledgment. As such, low usage of the available communication bandwidth resulting in an inefficient communication is a problem associated with stop-and-wait.

Hybrid ARQ may be coupled with stop and wait scheme, however, the result does not overcome the idle communication channel problem experience while waiting for the acknowledgment. Hybrid ARQ may also be coupled with selective repeat scheme; however, the result is not without the known problems. In fact, when hybrid ARQ is coupled with the selective repeat scheme, the requirement of the memory size is substantially increased because in addition to the storing at least one copy of the data packets, additional copies may need to be stored for soft combining operation of the hybrid ARQ portion.

Therefore, there is a need for a method and apparatus of ARQ which provides efficient use of the communication resources without the known complexity of the prior arts.

DETAILED DESCRIPTION OF THE PREFERRED EMBODIMENT(S)

According to various aspects of the invention, a method and apparatus provides an automatic request scheme which results in an efficient use of the communication resources without an added complexity or cost.

Dual-Channel Stop-and-Wait ARQ

Dual channel Stop-and-Wait ARQ offers a solution by parallelizing the stop-and-wait protocol and in effect running a separate instantiation of the ARQ protocol in the idle channels. As a result no system capacity goes wasted since one instance of the algorithm communicates a data block on the forward link at the same time that the other communicates an acknowledgment on the reverse link.

Figure 1:
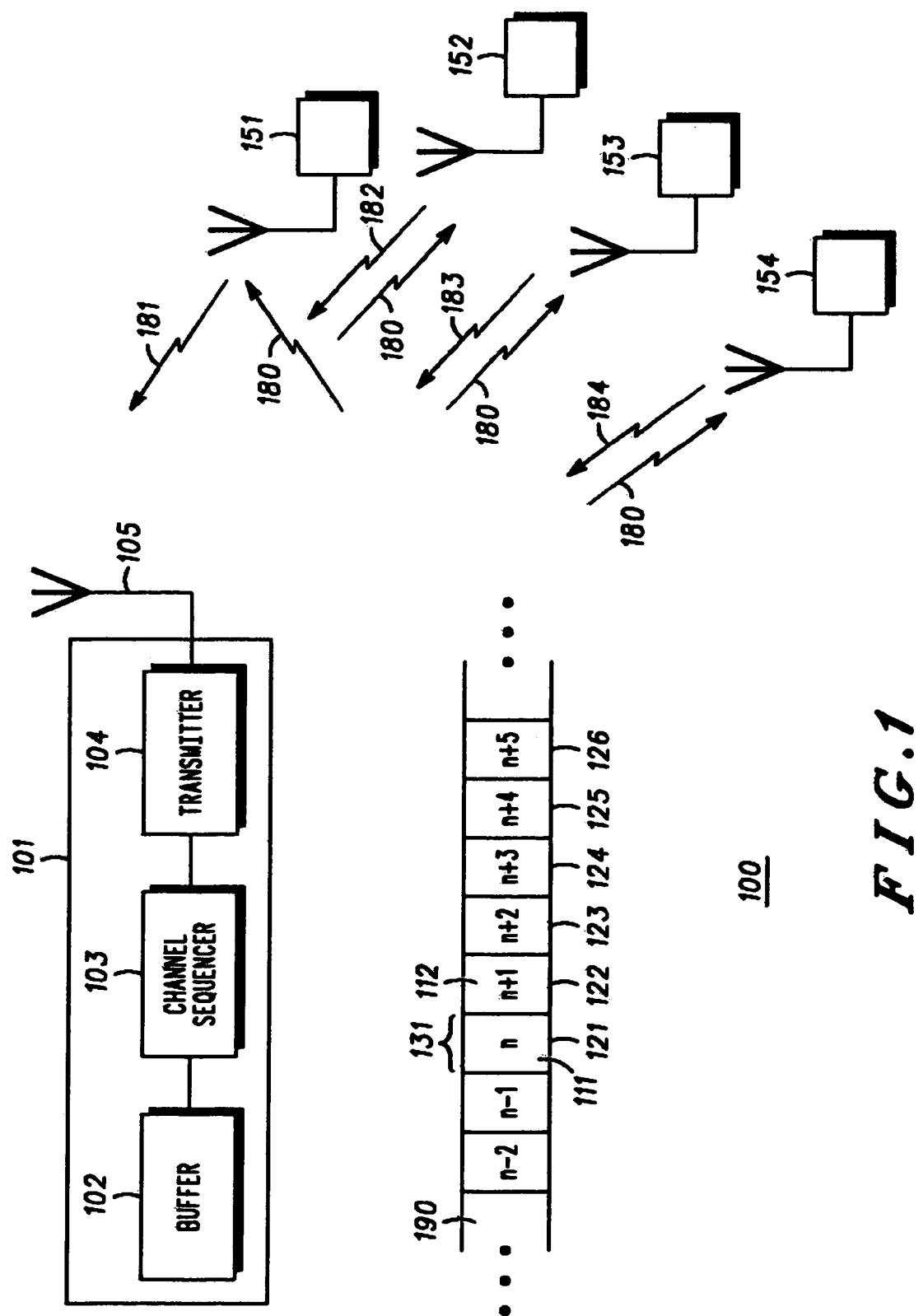
FIG. 1 depicts a communication system employing prior-art ARQ.
Figure 2:
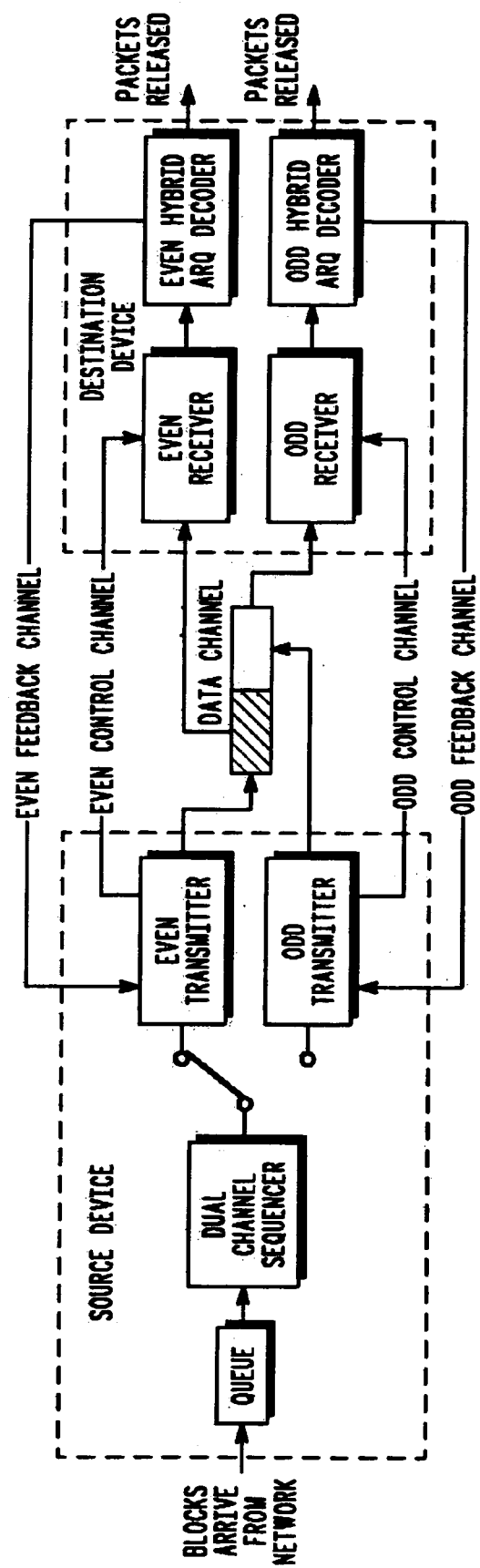
FIG. 2 is a block diagram of a system consisting of a single source and destination over a slotted data channel in accordance with the preferred embodiment of the present invention.

In packet systems one often finds that a single user occupies the entire channel over a series of timeslots. FIG. 2 models a system consisting of a single source and destination over a slotted data channel. The model divides the data channel into even and odd time slots to identify the independent instances of the ARQ protocol. The even or odd state is signaled explicitly on the F-DCH. Data blocks arrive from the network and are queued at the source. The source than employs a dual channel sequencer to admit data blocks to either the even or odd transmitter. Once admitted each transmitter performs a conventional stop-and-wait ARQ algorithm in its respective even or odd timeslot by transmitting the data block on the data channel and sequence bit on the associated control channel. Similar to the source, the destination device contains both an odd and even receiver receiving blocks from the respective even and odd timeslots (a.k.a. 5 ms frames). Each receiver is coupled with an independent hybrid ARQ decoder. The hybrid ARQ decoder signals the success (or failure) of the data block on a separate feedback channel. The hybrid ARQ decoder will store all symbols from unsuccessful attempts for the current sequence number. At most, one even set of symbols and one odd set of symbols are stored by the even and odd hybrid ARQ decoder, respectively. Independent feedback channels exist to support each instance of the stop-and-wait. The feedback channel is scheduled on the reserve link in the frame immediately following the forward link transmission.

Figure 3:
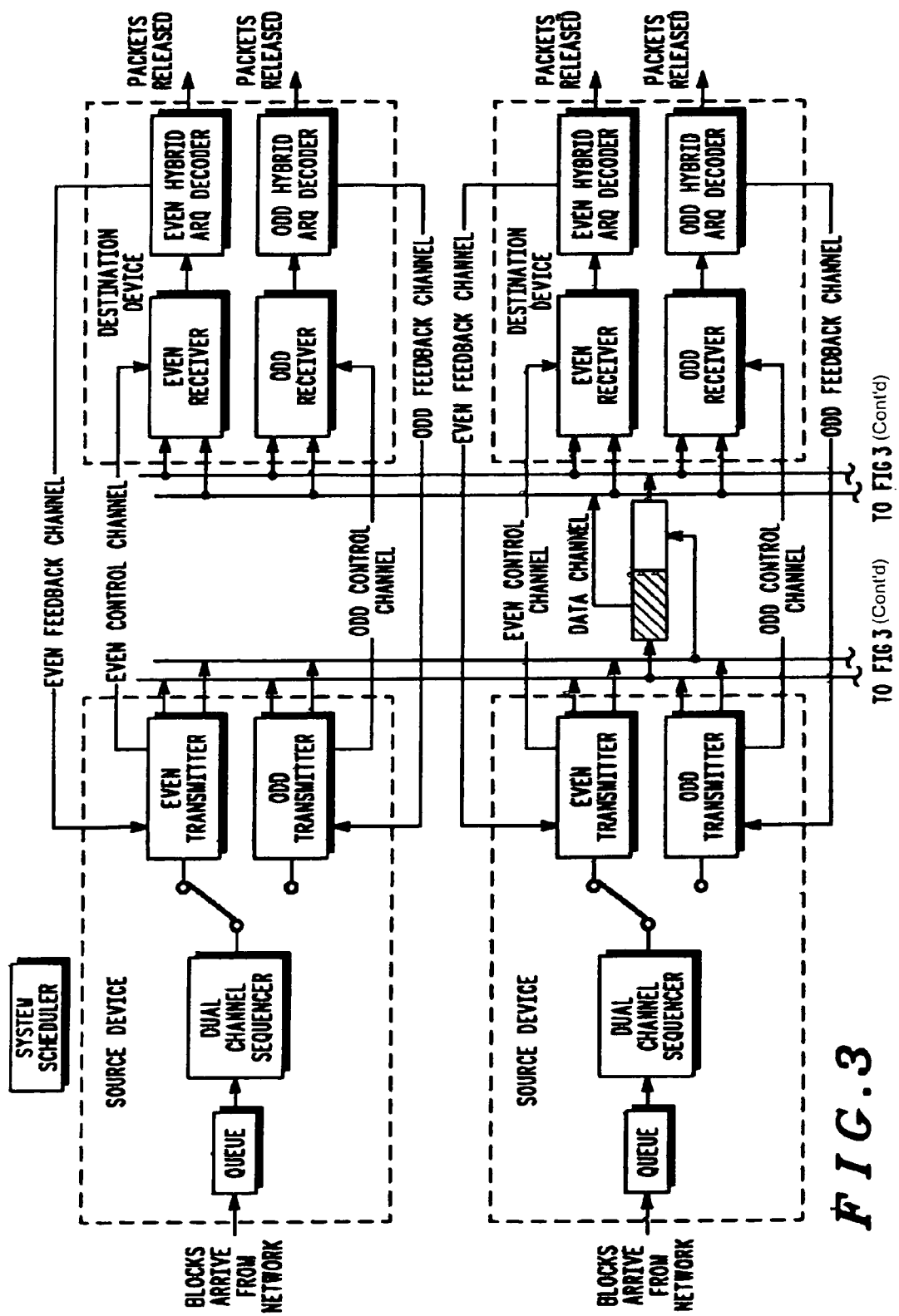
FIG. 3 is a block diagram of a system consisting of multiple sources and destinations over a slotted data channel in accordance with the preferred embodiment of the present invention.
Figure 3:
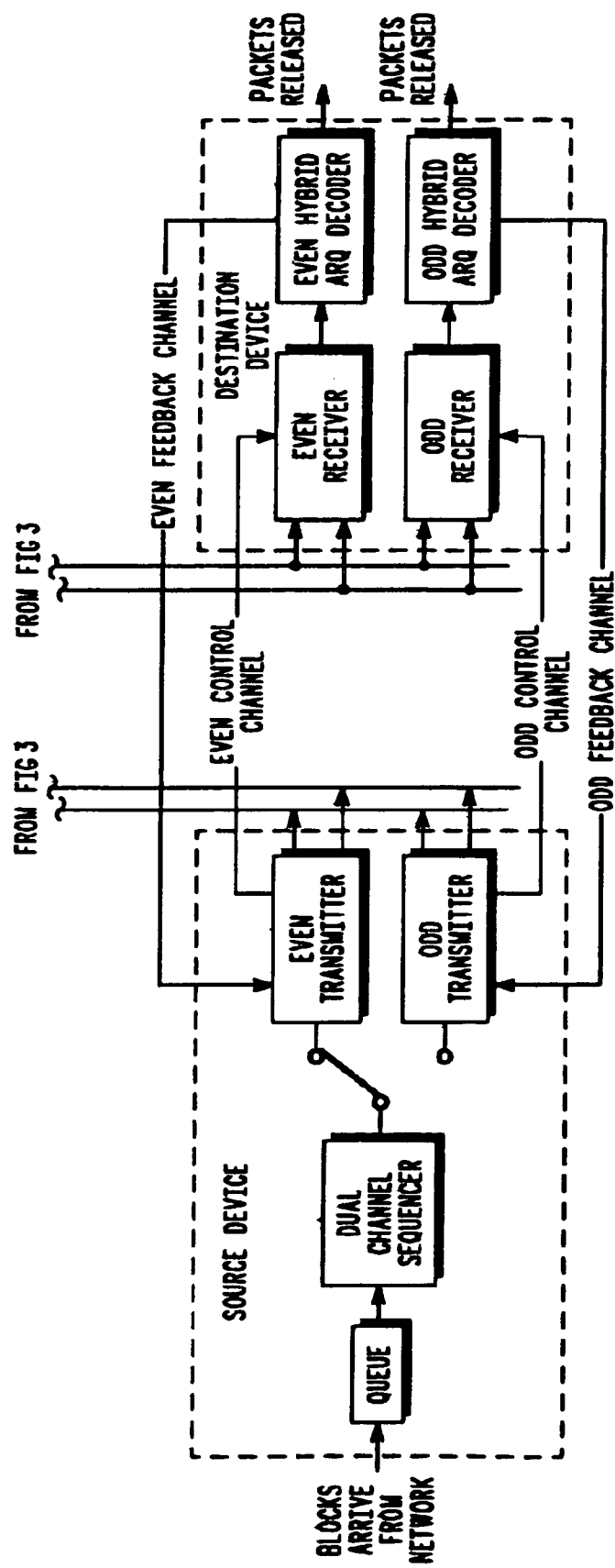

FIG. 3 extends the model described in FIG. 2 to multiple sources and destinations. The source and destination devices are identical to Figure and are coupled by independent control and feedback channels. Unlike FIG. 2, all source and destination pairs share one data channel. Therefore, a system scheduler is required to arbitrate between the multiple sources in the system. The scheduler will select which source owns the current timeslot based on the status of each individual queue or possibly one large combined queue. In this case, the scheduler must communicate the ownership of the timeslot to the destination over the F-DCH in addition to the channel state, even or odd. In all other aspects, the system performs as in the single user case.

The dual channel stop and wait protocol operates over the F-SCH channel associated with F-DCH. The F-SCH carries the bearer data and is shared among multiple destination devices and will be decoded using the hybrid ARQ process. The F-DCH carries all the per-user control information such as the Dual Channel Identifier (DCHI), Sequence Number (SN), Abort Indication Aid (AIA), F-SCH Assignment and MSC identifier. Table 1 list control fields carried on the F-DCH.

TABLE 1

Control Fields for Dual-Channel Hybrid ARQ.

| Name | Size (bits) | Description | Function |
| --- | --- | --- | --- |
| DCHI | 1 | Dual Channel Indicator | Identifies current frame as belonging to either the even or odd instance of the stop-and-wait protocol. |
| SN | 1 | Sequence Number | The sequence number of the current frame taking on a value of either 0 or 1. SN is unique to the instance of stop-and-wait ARQ. |
| F-SCH-A | 8 | F-SCH Assignment | Identifies the Walsh-Hadamard codes assigned to the current user. |
| MCS | 3 | Modulation and Coding Scheme | Describes the modulation and coding scheme as specified in Table 2. |

Figure 4:
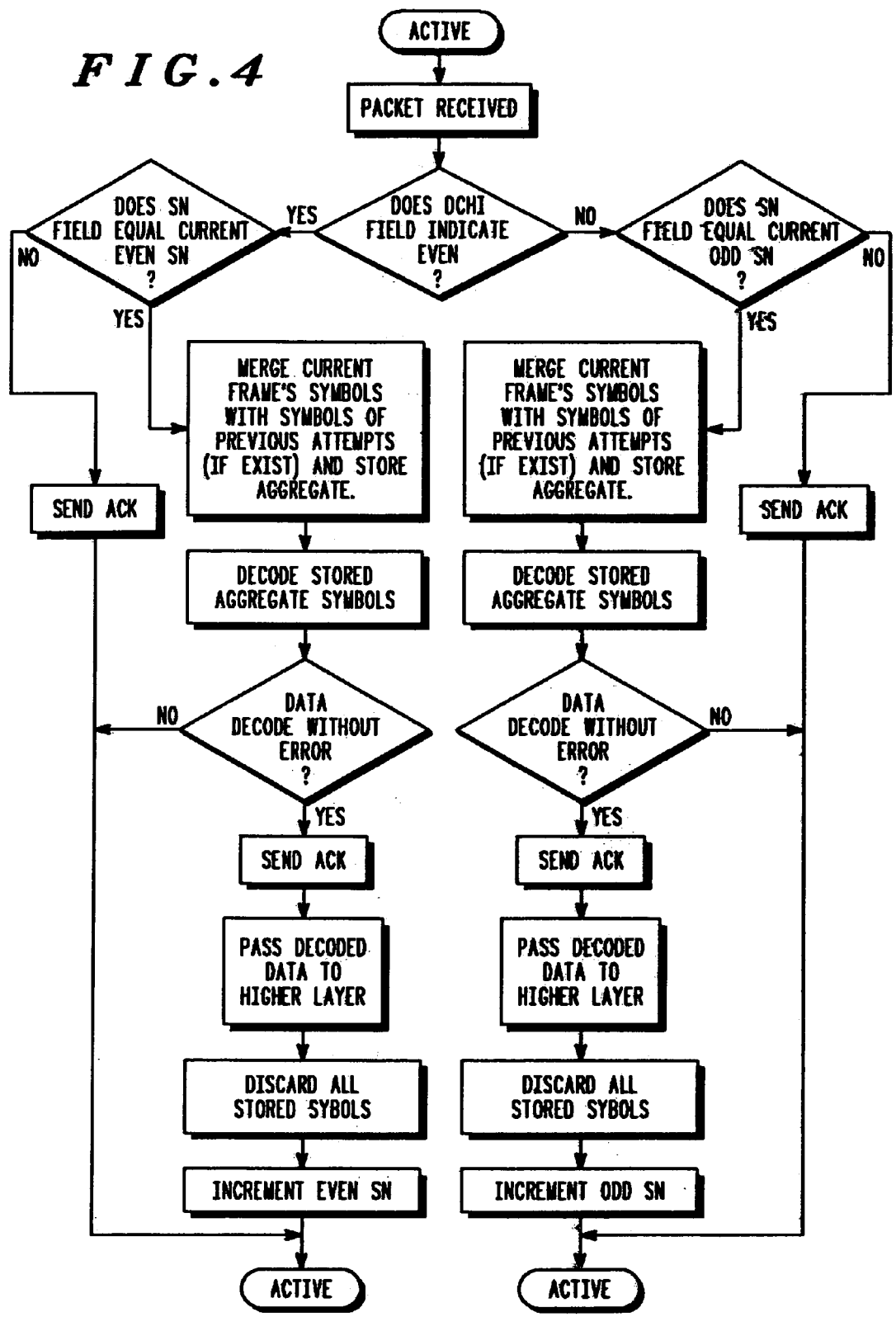
FIG. 4 is a flow chart showing operation of a dual channel receiver in accordance with the preferred embodiment of the present invention.

Operation of the dual channel receiver's is illustrated in FIG. 4. The source will identify a packet on the F-SCH destine for the destination device by sending the control information in Table 1 over the F-DCH simultaneously. The F-SCH-A and MCS fields identify the bearer symbols and format assigned to the destination device. The DCHI field identifies the packet as belonging to either even or odd instance of the Hybrid ARQ control. Each even and odd instantiation will maintain an independent set of state variables and memory to store previous attempts. The local state variables include a current SN. The memory will store soft information for previous attempts of the current SN that has not been successfully decoded. After selecting an ARQ instance, the receiver checks the SN field. A SN field that does not match current SN suggests that the previous acknowledgement was lost, therefore, the receiver resends the ACK and discards the current data samples. When the SN field matches the current SN, the receiver merges the current frame's symbols with the symbols of previous attempts if they exist. The receiver then tries to decode the aggregate symbols. If successfully decoded, the receiver sends an acknowledgement to the source, passes decoded data to a higher layer, discards all stored symbols from memory and increments the current SN. Otherwise, the receiver takes no action and waits for the next attempt.

Modulation and Coding Selection Scheme for Forward Shared Channel

The Modulation and Coding Scheme (MCS) for Forward Shared Channel uses QPSK, 16 QAM and 64 QAM modulation with three basic Turbo coding rates (R) of 1, ¾ and ½ respectively. The MCS operates in conjunction with Hybrid ARQ. The initial MCS for each IP packet is selected based on average link quality. Table 2 provides a list of seven (7) MCS schemes used for the Forward Shared Channel.

TABLE 2

Modulation and Coding Schemes (MCS)

| MCS | Modulation | Code Rate |
|-----|------------|-----------|
| 7   | 64         | 1         |
| 6   | 64         | ¾         |
| 5   | 64         | ½         |
| 4   | 16         | ¾         |
| 3   | 16         | ½         |
| 2   | 4          | ¾         |
| 1   | 4          | ½         |

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. In a data transmission system employing hybrid automatic retry request (HARQ), a method for transmitting data to multiple users over a single data channel, the method comprising the steps of:
   selecting a user that owns a current time slot;
   communicating ownership of the time slot to the user that owns the current time slot over a Forward Dedicated Control Channel (F-DCH);
   communicating a per user stop-and wait ARQ channel identifier to the user over the F-DCH; and
   transmitting data over the single data channel.

2. The method of claim 1 wherein the step of transmitting data over a single data channel comprises transmitting data over a forward shared channel (F-SCH).

3. The method of claim 2 wherein transmitting data over a forward shared channel comprises transmitting data over a forward shared channel that uses one of a plurality of modulation and coding schemes.

4. The method of claim 1 further comprising communicating a per-user abort indicator over the Forward Dedicated Control Channel (F-DCH) prior to transmitting over the single data channel.

5. The method of claim 1 further comprising communicating a per-user modulation and coding scheme over the Forward Dedicated Control Channel (F-DCH) prior to transmitting over the single data channel.

6. The method of claim 1 further comprising communicating a per-user code rate assignment over the Forward Dedicated Control Channel (F-DCH) prior to transmitting over the single data channel.

7. The method of claim 6 wherein communicating a per-user code rate assignment over the Forward Dedicated Control Channel (F-DCH) comprises communicating a per-user Walsh-Hadamard code.

8. The method of claim 1 wherein selecting a user that owns a current time slot is based on a status of each individual user's queue.

9. The method of claim 1 wherein a modulation and coding scheme for transmitting data over a data channel is based on an average link quality.

10. In a data transmission system employing hybrid automatic retry request (HARQ), an apparatus comprising:
    a plurality of source transmitters each performing HARQ transmissions to a plurality of destination devices over a single data channel, the plurality of source transmitters comprising:
    a first HARQ transmitter;
    a second HARQ transmitter coupled to the first HARQ transmitter; and
    a system scheduler that selects a user that owns a current time slot, communicates ownership of the time slot to the user over a Forward Dedicated Control Channel (F-DCH), communicates a per user stop-and wait ARQ channel identifier to the user over the F-DCH and performs HARQ transmission via the first or the second HARQ transmitter to a destination device over the single data channel.

11. The apparatus of claim 10 wherein the system scheduler selects the user that owns the current time slot based on a combined queue.

12. The apparatus of claim 10 wherein the first HARQ transmitter is an odd HARQ transmitter, the second HARQ transmitter is an even HARQ transmitter, and HARQ transmission via the first or the second HARQ transmitters takes place via the odd or the even HARQ transmitter.

13. The apparatus of claim 10 wherein the system scheduler selects the user that owns the current time slot based on a status of each individual user's queue.

14. In a data transmission system employing hybrid automatic retry request (HARQ), an apparatus comprising:
    means for selecting a user that owns a current time slot based on a status of each individual user's queue;
    means for communicating ownership of the time slot to the user that owns the current time slot over a Forward Dedicated Control Channel (F-DCH);
    means for communicating a per user stop-and wait ARQ channel identifier to the user over the F-DCH;
    means for transmitting data over a single data channel.

* * * * *